May 6, 1952  D. A. PRICE, SR  2,595,703
CONVEYER FLIGHT
Filed June 16, 1950  2 SHEETS—SHEET 1
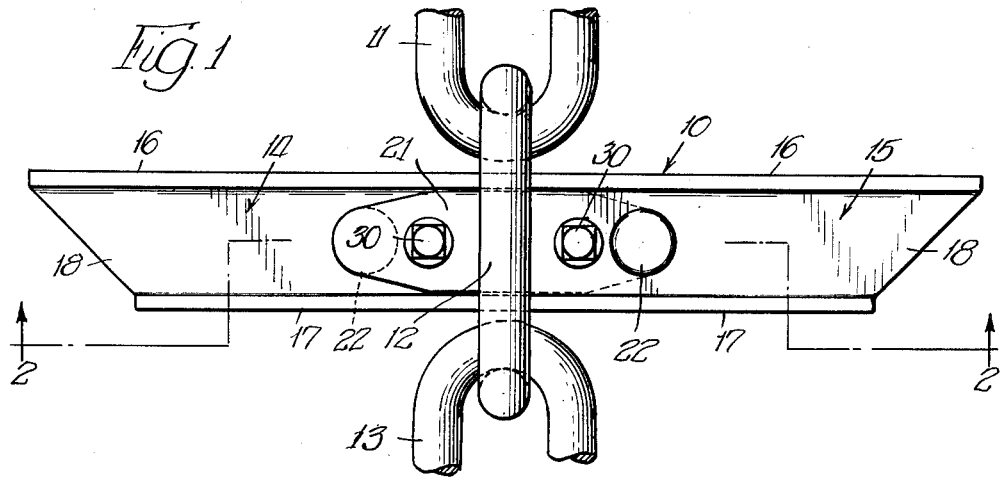
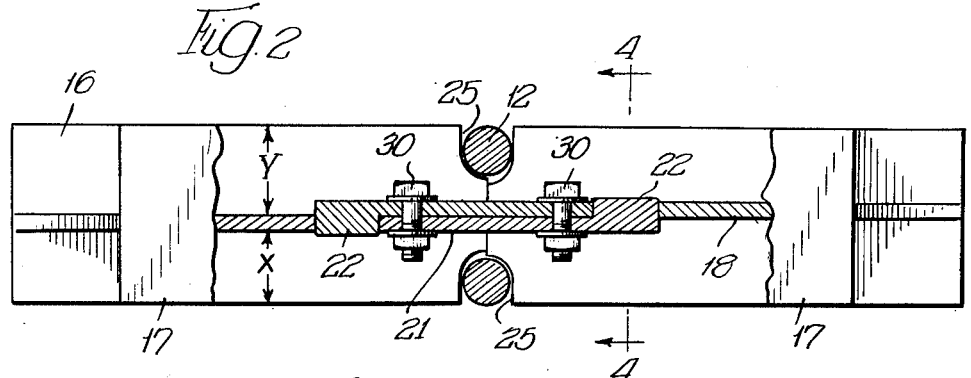
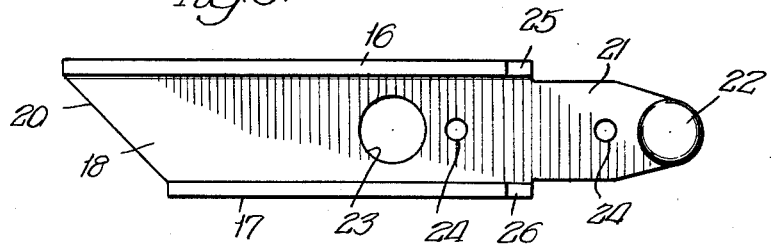
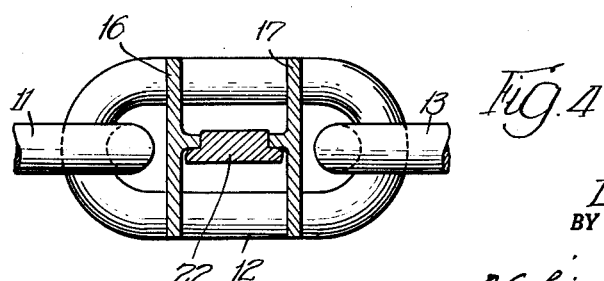
INVENTOR.
Donald A. Price, Sr.
BY May 6, 1952 D. A. PRICE, SR 2,595,703
CONVEYER FLIGHT
Filed June 16, 1950 2 SHEETS—SHEET 2
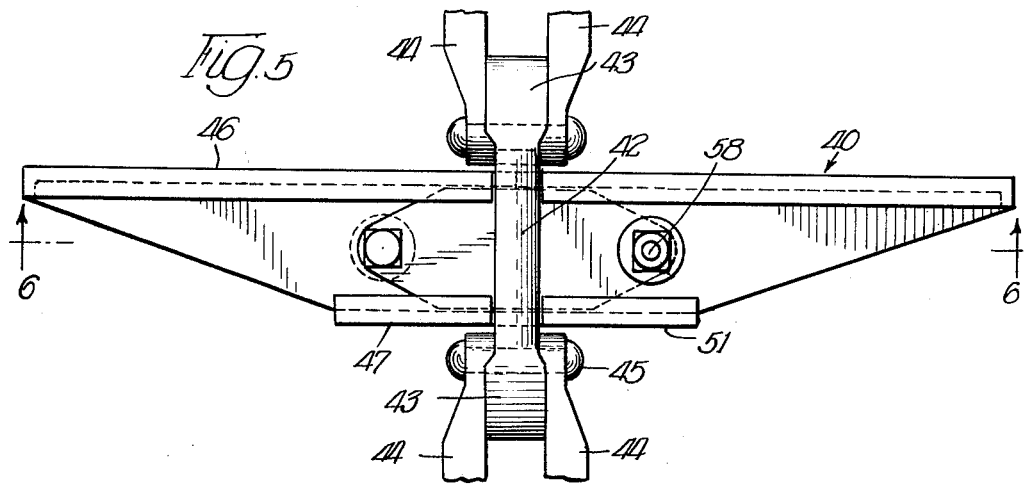
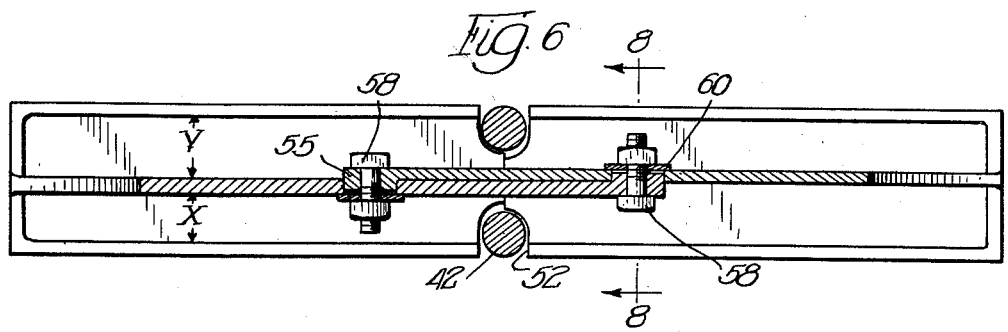
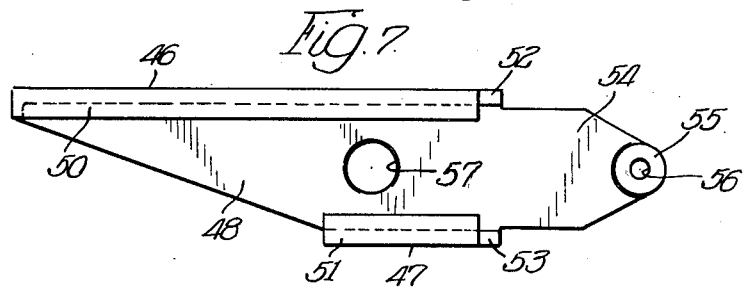
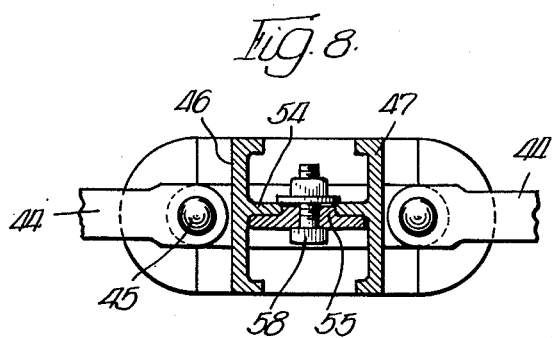
INVENTOR.
Donald A. Price, Sr.
BY Patented May 6, 1952

2,595,703

UNITED STATES PATENT OFFICE 2,595,703

CONVEYER FLIGHT

Donald A. Price, Sr., San Leandro, Calif., assignor to American Brake Shoe Company, New York, N. Y., a corporation of Delaware Application June 16, 1950, Serial No. 168,625

9 Claims. (Cl. 198—176)

The invention relates to conveyer flights and has reference in particular to improvements in sectional conveyer flights whereby the detachable sections of the flight may be assembled on a conveyor chain and interlocked with each other in assembled relation.

The two-piece conveyer flight of the invention is adapted to be attached to and propelled by transmission means such as an endless chain of conventional construction, the combination finding extensive use in saw mills, mines and elevators in moving material along a trough. Each half section of the conveyer flight is preferably cast in the shape desired and the improved features reside in the interlocking of the sections for operatively affixing the assembled conveyer flight to its link of the endless chain.

Accordingly, an object of the invention is to provide a two-piece conveyer flight wherein the half sections are substantial duplicates and so can be used as either right or left sections, wherein improved locking means are formed integral with each half section, and which provides a design of conveyer flight that is economical to manufacture although highly satisfactory in operation.

Another object of the invention is to provide a two-part conveyer flight for use on chain conveyers and which is adapted to be interlocked with a link of the chain conveyer by the interengaging and interlocking construction of the inner ends of each part and which does not require that the link be opened up or altered in any way.

Another object resides in a two-part conveyer wherein each part is identical in construction, being characterized by an opening and a lug so that when assembled the lug on each part fits snugly in the opening in the other part. With the parts so interlocked it is only necessary to employ one or more bolts to hold the device assembled.

Another object is to provide a conveyer flight having flanged edges for greater stiffness and more wearing area where the flight slides on the trough, to provide a conveyer flight which will be substantial and durable in construction, and a conveyer flight of the sectional type having interlocking features which materially reduce shearing stresses in addition to enabling ready and convenient assembly of the parts.

With these and various other objects in view the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Figure 1 is a side elevational view of a sectional conveyer flight embodying the features of the present invention, the flight being shown in assembled relation with a link of a standard endless chain;

Figure 2 is a sectional view taken substantially along line 2—2 of Figure 1 and illustrating the interlocking features herein referred to;

Figure 3 is a side elevational view of one section of the present conveyer flight;

Figure 4 is a transverse sectional view taken substantially along line 4—4 of Figure 2;

Figure 5 is a side elevational view of a modified form of a sectional conveyer flight coming within the invention, the same being shown in assembled relation with the link of a standard drag chain;

Figure 6 is a sectional view taken substantially along line 6—6 of Figure 5;

Figure 7 is a side elevational view of one section of the modified conveyer flight shown in Figure 5; and Figure 8 is a transverse sectional view taken substantially along line 8—8 of Figure 6.

Referring to the drawings, particularly Figures 1 to 4 inclusive, the sectional conveyer flight indicated by numeral 10 is disclosed in assembled relation with a standard chain comprising connected links 11, 12 and 13. Each link includes semi-circular ends joined on respective sides by straight portions and it will be observed that the sectional flight conveyer 10 is affixed to link 12, having associated relation with the intermediate straight portions of said link.

The flight conveyer of the invention is formed of half sections 14 and 15, each half section comprising a casting having a top plate 16 substantially flat throughout its extent, a bottom plate 17, also substantially flat throughout its extent, and a web 18 joining the top and bottom plates to form a unitary assembly. In order that the web of one flight section may overlap the web of the other section it will be observed that the web is slightly offset with respect to the longitudinal center line. This will be clear from Figure 2 wherein it will be seen that the distance Y is greater than the distance X. The flight conveyer sections are substantially identical in construction, with the top plate 16 of each section having the same width as the bottom plate 17 although as regards length, the top plate is somewhat longer, providing a substantial overhang at the outer end which forms the diagonal edge 20 at this end of the connecting web.

Referring particularly to Figure 3, wherein a flight conveyer section is shown in side elevation, it will be observed that a nose portion is provided by the web at the inner end of the section. The nose portion indicated by numeral 21 is formed by a projecting length of the web which projects beyond the top and bottom plates, and in accordance with the invention the nose portion terminates in a lug 22. The lug extends on one side of the web and the diameter of the lug is substantial since the same is employed for the purpose of interlocking the conveyer sections in assembled relation. For this purpose the web 18 of each section is provided with an opening 23 located approximately intermediate its length and in this form of the invention a plurality of bolt receiving openings 24 are also formed in the web, the same being located in spaced relation between the lug 22 and the opening 23. The top plate 16 and the bottom plate 17 of each half section is cut away at the inside corners respectively to provide spaces for receiving the straight sections of the chain link, and, as shown in Figure 3, the recesses on each side are indicated by numerals 25 and 26. Similar recesses are provided on opposite sides as regards the top and bottom plates of each conveyer section and in assembled relation a semi-circular opening is formed for the link sections.

The manner in which the conveyer sections are interlocked is clearly shown in Figure 2. Due to the offset relation of the webs 18 of the coacting sections it will be seen that the said webs overlap. Actually the nose portions 21 extend through the link and said nose portions overlap, with the result that the lug 22 of one section has location in opening 23 of the other section. By locating the bolts 30 in the aligned openings 24 the interlocked sections are held in assembled relation and the conveyor flight is securely fixed to its particular chain link 12. It is relatively easy to assemble or disassemble these sections and the design has the advantage of providing an interlocking of the sections which is strong and durable and which will materially reduce the shearing stresses that would otherwise be placed on the securing bolts 30.

The modified form of the invention shown in Figures 5 to 8 inclusive is substantially the same as the structure just described with the exception of the securing bolts, which, in the modified form, are located in the lugs so as to reduce the number of openings required to be formed in the web of each section. This modified form of conveyer flight is disclosed in combination with a chain of the drag-link type including a closed link 42 having intermediate straight portions and arcuate ends, the latter being indicated by numeral 43 and which are slightly greater in thickness than the straight portions of the link. A pair of side members 44 are secured to each end of the link 42 by means of the rivet pin 45.

The modified form of flight conveyer 40 is associated with the link 42, being affixed to the link by the construction of the half sections which are held in interlocked relation when assembled in much the same manner as previously described. As shown in Figure 7 each half section includes a flat top plate 46 and a flat bottom plate 47, the plates being connected by the web 48 which is slightly displaced with respect to the longitudinal center of the plates in order to permit overlapping, as will be clearly understood. In this modified form the top and bottom plates are provided with flanged edges, the numeral 50 indicating the flanged edge for the top plate 46 and numeral 51 indicating the flanged edge for bottom plate 47. For accommodating the straight portions of link 42 the plates at their respective inside corners are recessed as at 52 and 53. The web at this inner edge of each conveyer section is extended beyond the top and bottom plates to provide a nose portion 54 which terminates at its forward end in the lug 55, the same being apertured as at 56. Also the web 48 of each section is provided with an opening 57 having a diameter such as will accommodate a lug 55 and which is so located as to receive the lug of the opposite section when the sections are assembled.

Figure 6 clearly indicates the manner in which the nose portions 54 extend through the apertured link 42 and overlap to position lug 55 of one in the opening 57 of the other section. In this respect the interlocking feature of the form shown in Figures 1 to 4 inclusive is substantially identical with the modification of Figures 5 to 8 inclusive. However, as shown in Figure 6, each lug 55 is provided with an opening 56 for receiving a securing bolt 58, the same being disposed transversely of the overlapping webs and functioning to hold the parts in assembled relation through the instrumentality of a washer 60 or the like adapted to overlie the opening 57 on the side opposite the lug.

In assembling the sectional conveyor flight of the invention the nose portion of each section is extended through the opening in the apertured link. The nose portions extend for a distance as permitted by contact of the straight portions of the link with the recesses 25, 26 and 52, 53 respectively. The nose portions have overlapping relation since the intermediate webs have been offset with respect to the longitudinal center link for the purpose and an interlocking of the nose portions naturally results since the lug at the terminal end of one nose portion is received in the opening of the other section. The alignment of the lugs and openings is such that when the sections are assembled the top and bottom plates are horizontally aligned and the straight portions of the link are confined in the openings formed by the recesses. The sections are held in assembled relation by securing means which in Figure 6 requires only one opening, the same being located in each lug.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In a detachable assembly of the character described, the combination with one of the links of an endless chain conveyer, of separable conveyer flights each including flat top and base plates joined by an intermediate web, the said web at one end of each flight projecting beyond the top and base plates thereof to form a nose portion, each said nose portion terminating in a lug, and each web having an opening approximately centrally of its length of a size adapted to receive the lug of the opposite flight conveyer.

2. In a detachable assembly of the character described, the combination with one of the links of an endless chain conveyer, of separable conveyer flights having interengaging and interlocking relation for maintaining the flights assembled and affixed to the link, each conveyer flight having a flat top plate and a flat bottom plate joined by an intermediate web, said web being slightly offset with respect to the longitudinal center to permit overlapping of the webs, and the web of each flight conveyer providing a lug and an opening, whereby in assembled relation the lug of one flight conveyer has location in the opening of the other flight conveyer.

3. In a detachable assembly of the character as defined by claim 2, additionally including securing means disposed transversely of the overlapping webs for securing the conveyer flights in assembled relation.

4. In a detachable assembly of the character described, the combination with one of the links of an endless chain conveyer, of separable conveyer flights having interengaging and interlocking relation for maintaining the flights assembled and affixed to the link, each conveyer flight having a top plate, a bottom plate and a longitudinally extending web joining the plates and being slightly offset with respect to the center to permit overlapping of the webs, the web of each flight at one end projecting beyond the top and bottom plates thereof to form a nose portion, each nose portion terminating in a lug, and the web of each flight having an opening, whereby in assembled relation the lug of one flight conveyer has location in the opening of the other flight conveyer.

5. In a detachable assembly of the character as defined by claim 2, additionally including securing means disposed transversely of the overlapping webs for securing the conveyer flights in assembled relation.

6. A conveyor flight adapted to be releasably affixed to a standard conveyor chain having an apertured link, said conveyor flight including separable flight sections each comprising a top plate, a bottom plate and an intermediate connecting web, the said web projecting beyond the top and bottom plates of its respective section to form a nose portion, a lug provided by each nose portion, and the web of each section having an opening located in spaced relation to its lug, whereby in assembling the separable flight sections the nose portions are extended through the apertured link in opposed relation and said flight sections interlock by having the lug of each nose portion located in the opening in the web of the other section.

7. A conveyor flight adapted to be releasably affixed to a standard conveyor chain having an apertured link, said conveyor flight including separable flight sections each comprising a top plate, a bottom plate and an intermediate connecting web, the web of each section being offset with respect to the longitudinal center to permit overlapping of the webs, each web also projecting beyond the top and bottom plates of its respective section to form a nose portion, a lug located at the terminal end of each nose portion and being integral therewith, and the web of each section having an opening in spaced relation to its lug and of a size to receive the lug of the other section, whereby in assembling the separable flight sections the nose portions are extended through the apertured link in opposed relation and said flight sections interlock by having the lug of each nose portion located in the opening in the web of the other section.

8. A conveyor flight as defined by claim 7, additionally including securing means disposed transversely of the overlapping webs for securing the flight sections in overlapping relation.

9. A conveyor flight as defined by claim 7, additionally including securing means passing through each lug and extending transversely of said lug for securing assembled flight sections in interlocked relation.

DONALD A. PRICE, Sr.

REFERENCES CITED

The following references are of record in the file of this patent:

UNITED STATES PATENTS

| Number | Name | Date |
|---|---|---|
| 1,186,774 | Harris | June 13, 1916 |
| 2,409,318 | Sivyer | Oct. 15, 1946 |